A. WELLS.
Potato Digger.

No. 21,225.

Patented Aug. 17, 1858.

UNITED STATES PATENT OFFICE.

ALEXANDER WELLS, OF BROOKLYN, NEW YORK.

IMPROVEMENT IN MACHINES FOR DIGGING POTATOES.

Specification forming part of Letters Patent No. 21,225, dated August 17, 1858.

*To all whom it may concern:*

Be it known that I, ALEXANDER WELLS, of Brooklyn, in the county of Kings and State of New York, have invented a new and Improved Device for Digging Potatoes and other Roots or Vegetables; and I do hereby declare that the following is a full, clear, and exact description of the same, reference being had to the annexed drawings, making a part of this specification, in which—

Figure 1:
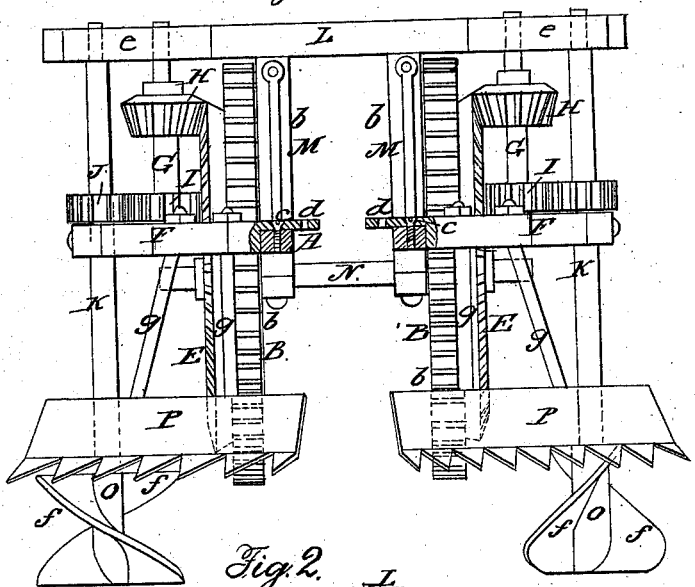
Figure 2:
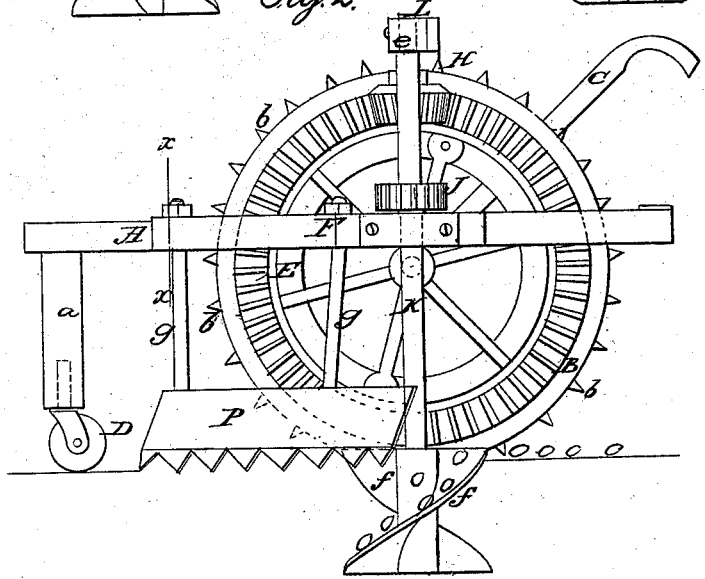

Figure 1 is a front sectional view of my invention, taken in the line $x\ x$, Fig. 2. Fig. 2 is a side view of the same.

Similar letters of reference indicate corresponding parts in the two figures.

This invention consists in the employment or use of rotating spirally-flanged diggers, which are fitted in adjustable frames attached to the main frame of the machine and operated by gearing from the wheels on which the main frame is mounted, in connection with the serrated or toothed clearers, the whole being arranged as hereinafter shown and described, whereby potatoes or other roots which are grown in hills or drills may, as the machine is drawn along, be expeditiously dug or brought to the surface of the ground, so that they may be gathered with the greatest facility.

To enable those skilled in the art to fully understand and construct my invention, I will proceed to describe it.

A represents a horizontal rectangular frame, which is mounted on wheels B B, said frame having handles C attached to its back part. To the front part of the frame A a pendant, $a$, is attached, said pendant having a caster-wheel, D, at its lower end. The peripheries of the wheels B B are provided with teeth or projections $b$, which penetrate the earth and prevent the slipping of the same. To the outer side of each wheel B B a beveled-toothed wheel, E, is attached.

To each side of the frame A a horizontal frame, F, is attached by screws $c$ at both ends. The ends of the frames F have a series of holes, $d$, made through them, so that they may be adjusted laterally in and out from the frame A. In each frame F a vertical shaft, G, is placed, and on each shaft a bevel-pinion, H, is secured, into which the wheels B B gear. A pinion, I, is placed on the lower end of each shaft G, and these pinions gear into pinions J, which are placed on shafts K, which are also fitted in the frames F. The upper ends of the shafts G K have their bearings $e$ attached to a bar, L, which are secured to uprights M M on the frame A. The bearings $e$ may be adjusted on the bar L, and the wheels B B may be adjusted on their axle N and keyed at any desired point.

The shafts K extend down below the frames F, and a double spiral-flanged hub, O, is fitted on the lower end of each shaft K. The two flanges, $f\ f$, of each hub O are placed at opposite sides of the hub, as shown clearly in both drawings, and the hubs may be adjusted higher or lower on the shafts and secured by set-screws at any desired point, as occasion may require. The flanges $f$ should be of sufficient height to extend to the bottom of the hills or furrows.

Directly in front of each hub O a plate, P, is placed. These plates are placed in oblique positions relatively with the hubs, so as to cast or throw articles that obstruct their path outward from the machine at each side. The plates P are attached to the frames F by rods $g$, and the lower edges of the plates are serrated or toothed, one side of each tooth being inclined more than the other in order to cast weeds, grass, &c., off from the machine.

The operation is as follows: As the machine is drawn along the flanged hubs O O are rotated from the wheels B B by means of the gearing E H I J, and the flanges $f$ of the hubs O throw the potatoes to the surface of the ground, the frames F being so adjusted that each hub O will enter a drill, two drills being therefore dug at the same time. The plates or clearers P remove all weeds, grass, &c., that might obstruct the operation of the flanged hubs, and also level the ground, so that the potatoes will be cast up, deposited, and fully exposed on a level surface.

The operator or attendant on arriving at the ends of drills or rows raises the back end of the machine, so that it may readily turn on the caster-wheel D.

The flanged hubs O may be constructed of cast metal, and also the gearing and frames F. The main frame A may be of either metal or wood.

The clearers or plates P may be of boilerplate iron. The lower toothed parts, if necessary, may be steel welded to the upper parts.

Having thus described my invention, what I claim as new, and desire to secure by Letters Patent, is—

The rotating spirally-flanged diggers O, in connection with the clearers P, arranged for joint action, substantially as and for the purpose specified.

ALEXANDER WELLS.

Witnesses:
J. T. BUCKLEY,
MICH. HUGHES.